(12) United States Patent
Merkulov et al.

(10) Patent No.: US 9,069,361 B2
(45) Date of Patent: Jun. 30, 2015

(54) THERMOSTAT WITH SET POINT RANGE FEEDBACK

(75) Inventors: Vitaliy Merkulov, Westfield, MA (US); David Elrod, Beaverton, OR (US); Daniel Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 619 days.

(21) Appl. No.: 13/432,735

(22) Filed: Mar. 28, 2012

(65) Prior Publication Data
US 2013/0013118 A1 Jan. 10, 2013

Related U.S. Application Data

(63) Continuation-in-part of application No. 13/178,723, filed on Jul. 8, 2011, now Pat. No. 8,725,303.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05D 23/19 | (2006.01) |
| F24F 11/00 | (2006.01) |

(52) U.S. Cl.
CPC ..... *G05D 23/1902* (2013.01); *F24F 2011/0075* (2013.01)

(58) Field of Classification Search
CPC .................................................. G05D 23/1951
USPC .................. 700/274, 275, 276, 286, 299, 300
See application file for complete search history.

(56) References Cited

U.S. PATENT DOCUMENTS

| | | | |
|---|---|---|---|
| 4,730,941 A | 3/1988 | Levine et al. | |
| 2004/0138981 A1* | 7/2004 | Ehlers et al. | 705/36 |
| 2004/0139038 A1* | 7/2004 | Ehlers et al. | 705/412 |
| 2007/0013532 A1* | 1/2007 | Ehlers | 340/584 |
| 2007/0043478 A1 | 2/2007 | Ehlers et al. | |
| 2007/0242688 A1* | 10/2007 | McFarland | 370/445 |
| 2008/0183307 A1* | 7/2008 | Clayton et al. | 700/8 |
| 2010/0063832 A1 | 3/2010 | Brown | |
| 2010/0070093 A1 | 3/2010 | Harrod et al. | |
| 2010/0163633 A1* | 7/2010 | Barrett et al. | 236/49.3 |
| 2010/0289643 A1* | 11/2010 | Trundle et al. | 340/545.1 |
| 2011/0231320 A1* | 9/2011 | Irving | 705/80 |
| 2011/0257795 A1 | 10/2011 | Narayanamurthy et al. | |
| 2011/0290893 A1* | 12/2011 | Steinberg | 236/49.3 |
| 2013/0173064 A1* | 7/2013 | Fadell et al. | 700/276 |

* cited by examiner

*Primary Examiner* — Mohammad Ali
*Assistant Examiner* — Ziaul Karim
(74) *Attorney, Agent, or Firm* — Law Office of Gerald Maliszewski; Gerald Maliszewski (57) ABSTRACT

A thermostat user interface (UI) is provided for presenting calculated set point ranges. The thermostat UI has a major thermostat scale for presenting a current temperature and an overall range of feasible temperatures. A set point indictor indicates a set point input (e.g., desired temperature) with respect to the major thermostat scale. A minor thermostat scale presents a set point range, where the set point range is a range of permitted temperature measurement variations from the set point input. The set point range brackets the set point indicator with a maximum temperature value representing a highest temperature in the set point range, and a minimum temperature value representing a lowest temperature in the set point range. If high and low temperature set point indictors are used, then there are first and second minor thermostat scales bracketing, respectively, the high and low temperature set point indicators.

22 Claims, 5 Drawing Sheets

THERMOSTAT WITH SET POINT RANGE FEEDBACK

RELATED APPLICATIONS

This application is a Continuation-in-Part of a pending application entitled, SYSTEM AND METHOD FOR THE MULTI-DIMENSIONAL REPRESENTATION OF ENERGY CONTROL, invented by Daniel Park et al., Ser. No. 13/178,723, filed Jul. 8, 2011, which is incorporated herein by reference.

BACKGROUND OF THE INVENTION

1. Field of the Invention

This invention generally relates to energy management and, more particularly, to a thermostat with a means of providing the user with the range of temperatures permitted when selecting a temperature set point.

2. Description of the Related Art

Conventional thermostat controls, both graphical and physical, do not present to the user the range of acceptable temperatures that the system allows in the environment. At its discretion, the system may actively manage the temperature within the range, or the system may allow the temperature to naturally fluctuate in the range without taking corrective action. In thermostat controlled heating, ventilation, and air conditioning (HVAC) systems in use today a similar range is sometimes called the "dead zone". For example, that range may be a zone of plus and minus 1.5 degrees Fahrenheit around the desired temperature set point configured by the user. This dead zone allows the HVAC system to not operate when the temperature is within the range on the assumption that thermal mass will hold the temperature near the desired set point.

But there are other considerations besides thermal mass that may be used to adjust the range of acceptable environment temperature that the HVAC system will allow. The system may have other considerations such as environmental impact, expense, and comfort. When accounting for these additional considerations, the thermostatic control may have a wider range of temperatures which the user considers as acceptable, or it may cause the range to not be symmetric around the user-specified optimum set point.

With an advanced thermostat control/display, it is desirable that a system clearly show to the user the range of temperatures that the system allows (without corrective action) given user's optimum temperature set point and the settings of other factors to consider, such as environment, expense, or comfort. In addition, as the user adjusts these other factors, it would be advantageous to dynamically display the effect these changes have on the heating/cooling ranges by updating each range's size and location. This immediate feedback to the user of presenting the impact of their selections allows the user to make additional adjustments to the parameters based on their displayed effects.

SUMMARY OF THE INVENTION

Disclosed herein is a thermostat visualization and control interface. The interface is intuitive while presenting the salient information so that the user may make adjustments to the thermostat settings as needed. In one aspect, the thermostat is a graphical representation of a thermometer (e.g., bulb type) with a heating and cooling control object located on either side of the linear temperature indicator. The linear temperature indicator shows the maximum range of the system with the present measured temperature indicated on the scale.

For example, one side of the temperature scale may be the heating control object. This object is adjustable by the user so that the user's desired optimum heating set point is displayed. Around this desired optimum heating set point is a displayed range, which may be at the same scale as the temperature indicator, and which shows the maximum and minimum temperatures that the system allows when heating. On the other side of the temperature scale is the cooling control object. This object is similarly adjusted by the user to configure the optimum cooling set point. Around this desired optimum cooling set point is a displayed range (e.g., at the same scale as the temperature indicator), which shows the maximum and minimum temperatures that the system will allow when cooling.

Accordingly, a thermostat user interface (UI) is provided for presenting calculated set point ranges. The thermostat UI has a major thermostat scale for presenting a current temperature and an overall range of feasible temperatures. Thus, the major thermostat scale resembles a conventional thermostat. A set point indictor indicates a set point input (e.g., desired temperature) with respect to the major thermostat scale. A minor thermostat scale presents a set point range, where the set point range is a range of permitted temperature measurement variations from the set point input, a value entered by the user. The set point range brackets the set point indicator with a maximum temperature value representing a highest temperature in the set point range, and a minimum temperature value representing a lowest temperature in the set point range. In one aspect, there is a high temperature set point indictor indicating the high temperature set point, and a low temperature set point indictor indicating the low temperature set point input. Then, there is a first minor thermostat scale bracketing the high temperature set point indicator, and a second minor thermostat scale bracketing the low temperature set point indicator. The thermostat UI may be physical device or a graphic user interface (GUI).

Additional details of the above-described thermostat UI and an energy management system enabled using the thermostat UI are presented below.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with monitoring a controlling and displaying energy consumption characteristics. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge such as an SD card or USB dongle, a carrier wave as described hereinafter, or any other medium from which a computer can read.

Figure 1:
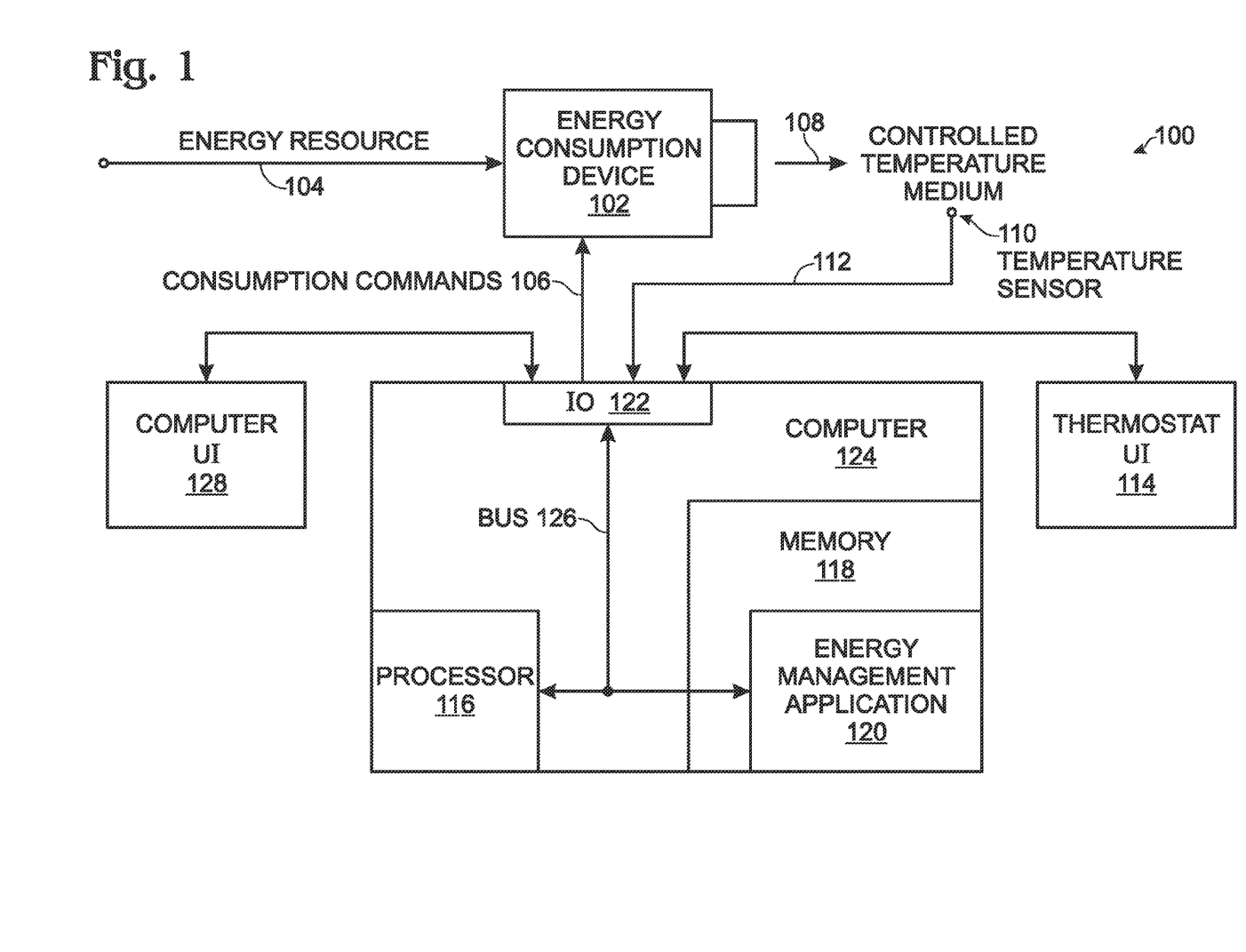
FIG. 1 is a schematic block diagram of a thermostat control system with set point ranging analysis.

FIG. 1 is a schematic block diagram of a thermostat control system with set point ranging analysis. The system 100 comprises an energy consumption device 102 having an input on line 104 to accept an energy resource, an input on line 106 to accept consumption commands, and an output 108 to supply a controlled temperature medium. For example, the energy consumption device may be an HVAC system that consumes gas and/or electricity, and supplies an air flow that is heated or cooled. A sensor 110 has an output on line 112 to supply a temperature measurement responsive to the temperature medium.

A thermostat user interface (UI) 114 accepts a temperature set point input from a user, and presents a set point range. The set point range is the range of permitted sensor temperature measurement variations from the set point input. For example, if the user selects a set point of 72 degrees, the thermostat UI may present a set point range that the system will permit the actual temperature to vary from 70 to 74 degrees in response to the selected set point of 72 degrees.

The system 100 further comprises a processor 116, a non-transitory memory 118, and an energy management application 120 stored as a sequence of software instructions in the memory 118 and executed by the processor 116 for managing the energy consumption device 102 and the thermostat UI 114. The energy management application 120 supplies the set point range to the thermostat UI in response to analyzing the set point input and the sensor temperature measurement. The energy management application 120 and processor 116 communicate with the energy consumption device 102, sensor 110, and thermostat UI 114 via input/output interface (IO) 122. These connections may be local direct connection, or supported by a network or local area network (LAN) using a modem, an Ethernet card, or any other appropriate data communications device such as USB to communicate. The physical communication links may be optical, wired, or wireless.

Although shown with separate reference designators, it should be understood that the processor, memory, and thermostat UI may be housed together in the same module. Alternatively, as shown, the processor 116, memory 118, and energy management application 120 may be enabled as a personal computer (PC), Mac computer, tablet, workstation, server, PDA, handheld device, or single-function device. The processor or central processing unit (CPU) 116 may be connected to memory 118 via an interconnect bus 126. The memory 118 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 116. The system 100 may further include appropriate computer UI 128, such as a display, keyboard, or touchscreen. Alternatively, communications with the computer 124 may be enabled via the thermostat UI 114.

In one aspect, the energy management application 120 accepts information selected such as a temperature control algorithm, weather forecast, energy cost forecast, a history of energy costs, user ecology criteria, user comfort criteria, or combinations of the above-mentioned information. The energy management application 120 supplies the set point range to the thermostat UI 114 in response to analyzing the set point input and the sensor temperature measurement, as modified by the information. For example, the user may be able to select a temperature control algorithm, and define the temperature control algorithms via the thermostat UI 114. Alternatively, such information may be entered via a web page in communication with the energy management application. The energy management application may track and record previous energy usage, weather, and costs, and be in communication with power utilities to receive current cost information. Likewise, weather forecasts may be received via a network connection.

As noted in parent application Ser. No. 13/178,723, an energy management application and associated UI can be used to input a user's temperature algorithm selection. In a simple case, the user can select between the algorithms of comfort, ecology, cost, or a combination of these algorithms. The selection of a particular algorithm may temper the user set point input and/or set point range. For example, the selection of the comfort algorithm is likely to leave the set point input unchanged, and to maintain a narrow set point range around the set point input. Alternatively, in hot ambient conditions the selection of the ecological algorithm may widen the set point range around the set point input, if the wider range is determined to more adequately satisfy ecological concerns.

The thermostat UI may be a physical device that resembles conventional technology thermostats (e.g., is configured as an arc-shaped dial where the user rotates the dial to enter the set point input(s). Alternatively, the thermostat UI may be a graphical user interface (GUI) enabled as a sequence of software instructions stored in the memory 118 and executed by the processor 116, for presentation on a display monitor. For example, the thermostat UI GUI 114 may be a display screen where the user enters commands using a keypad or other conventional 10 device. Alternatively, the thermostat GUI display monitor is a touchscreen to accept inputs from the user.

Figure 2:
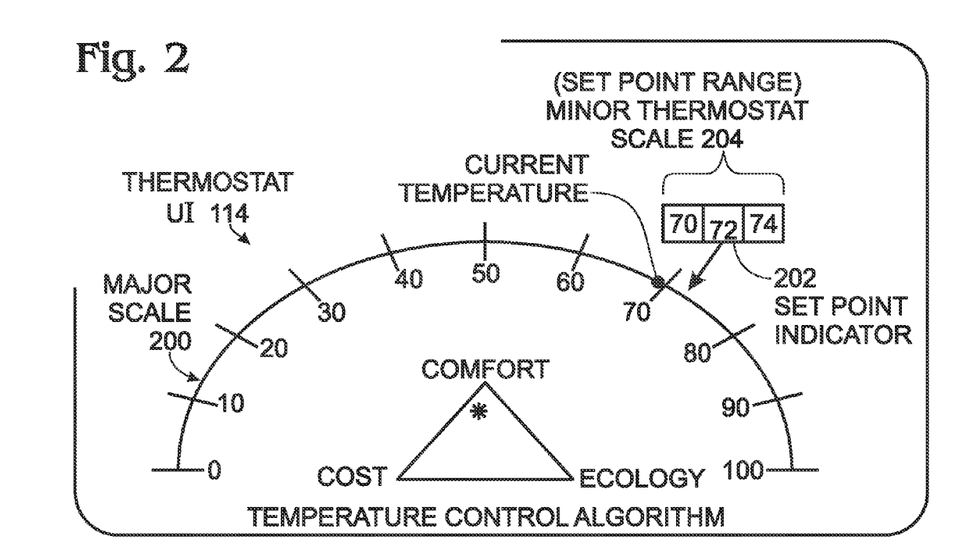
FIG. 2 is a diagram depicting an exemplary thermostat UI.

FIG. 2 is a diagram depicting an exemplary thermostat UI. As shown, the thermostat UI is enabled in an arc or dial design. In this example, the set point input is 72 degrees and the set point range is 70 to 74 degrees. This example also depicts a temperature algorithm input, where the user has selected a setting close the maximum comfort axis. In one aspect, the thermostat UI 114 accepts user inputs modifying the set point range, and the energy management application modifies a temperature algorithm in response to the modified set point range.

More explicitly, the thermostat UI 114 includes a major thermostat scale 200 for presenting a current temperature (e.g., 70) and an overall range of feasible temperatures (e.g., 0 to 100). A set point indictor 202 indicates the set point input (e.g., 72) with respect to the major thermostat scale 200. A minor thermostat scale 204 presents the set point range, bracketing the set point indicator 202 with a maximum temperature value representing a highest temperature in the set point range (e.g., 74), and a minimum temperature value representing a lowest temperature in the set point range (e.g., 70). Although an arc dial type design is shown, the thermostat UI can also be enabled in a number of other configurations, such as the mercury bulb design presented below.

Figure 3:
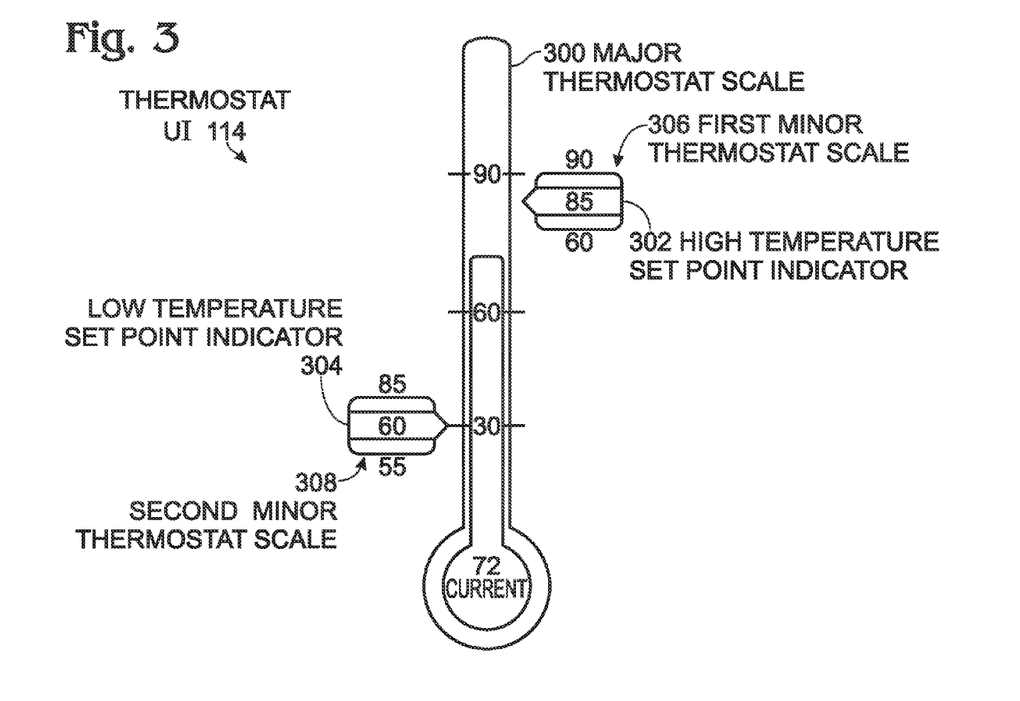
FIG. 3 is a diagram depicting a thermostat UI with two minor thermostat scales.

FIG. 3 is a diagram depicting a thermostat UI with two minor thermostat scales. In this aspect, the thermostat UI 114 accepts a high temperature set point input and a low temperature set point input. The thermostat UI 114 presents a high temperature set point range associated with the high temperature set point and a low temperature set point range associated with the low temperature set point input.

More explicitly, the thermostat UI 114 includes a major thermostat scale 300 for presenting a current temperature and an overall range of feasible temperatures. A high temperature set point indictor 302 indicates the high temperature set point input with respect to the major thermostat scale 300. A low temperature set point indictor 304 indicates the low temperature set point input with respect to the major thermostat scale 300. A first minor thermostat scale 306 presents the high temperature set point range, bracketing the high temperature set point indicator 302 with a maximum temperature value representing a highest temperature in the high temperature set point range, and a minimum temperature value representing a lowest temperature in the high temperature set point range. A second minor thermostat scale 308 presents the low temperature set point range, bracketing the low temperature set point indicator 304 with a maximum temperature value representing a highest temperature in the low temperature set point range, and a minimum temperature value representing a lowest temperature in the low temperature set point range.

In this example, the current temperature is 72, the high temperature set point indicator is set to 85, the low temperature set point indicator is set to 60, the first minor thermostat scale varies from 60 to 90, and the second minor thermostat scale varies from 55 to 85 degrees. Although a bulb type thermostat design is shown in this example, the thermostat UI could alternatively be enabled with an arc (dial) or other design.

As shown, the thermostat UI 114 presents first minor thermostat scale 306 and the second minor thermostat scale 308 on opposite sides of the major thermostat scale 300. Alternative, the minor scales may be located on the same side.

Figure 4:
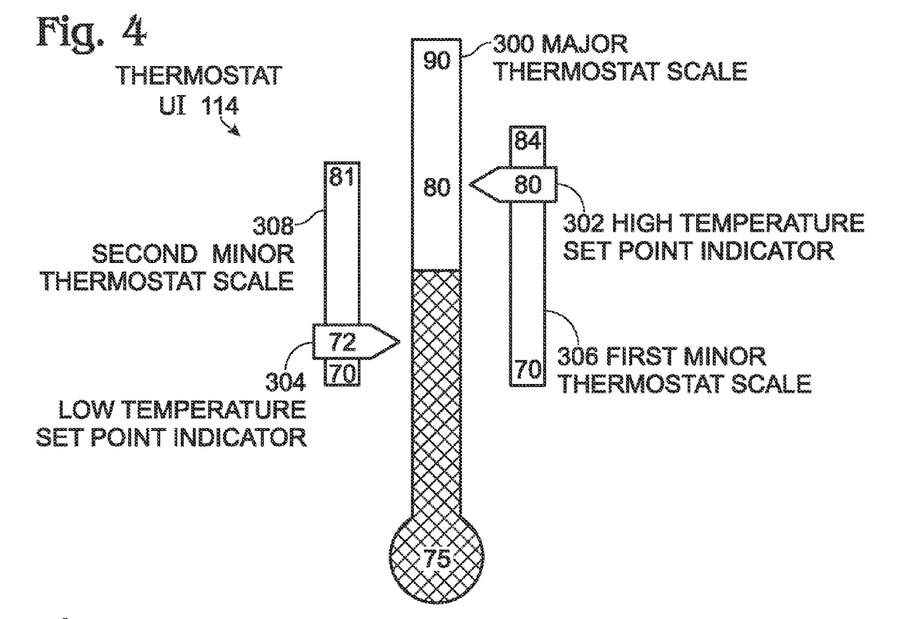
FIG. 4 is a diagram depicting a variation of the thermostat UI of FIG. 3.

FIG. 4 is a diagram depicting a variation of the thermostat UI of FIG. 3. In this aspect, it can be seen that high temperature set point range (e.g., 70 to 84) overlaps the low temperature set point range (e.g., 70 to 81). The high and low set points are not allowed to "cross" such that the low temperature set point input is greater than the high temperature set point input. However, the temperature range above the low temperature set point input may be greater than the temperature range above the high temperature set point input. The range below the low temperature set point input may be less than the range below the high temperature set point input. Similarly, the temperature range above the high temperature set point input may be greater than the temperature range above the low temperature set point input, and the range below the high temperature set point input may be less than the range below the low temperature set point input.

It can also be seen that the low temperature set point range need not be equal to the high temperature set point range. That is, the high temperature set point range spread may be different from a low temperature set point range spread. As shown, the high temperature set point range is 14 degrees, while the low temperature set point range is 11 degrees. However in other aspect, the range spreads may be the same, see FIG. 3.

In another aspect, it can be seen that the set point range has a maximum temperature value representing a high temperature in the set point range and a minimum temperature value representing a low temperature in the set point range. These maximum and minimum temperature values bracket the set point input in either a symmetric relationship, as shown in FIG. 2 (2 degrees on either side of the set point input), or asymmetrically as shown in FIG. 4. For example, in FIG. 4 the low temperature set point range minimum temperature value of 70 is only 2 degrees below the set point input of 72, while the maximum temperature value of 81 is 9 degrees above the set point input.

Figure 5A:
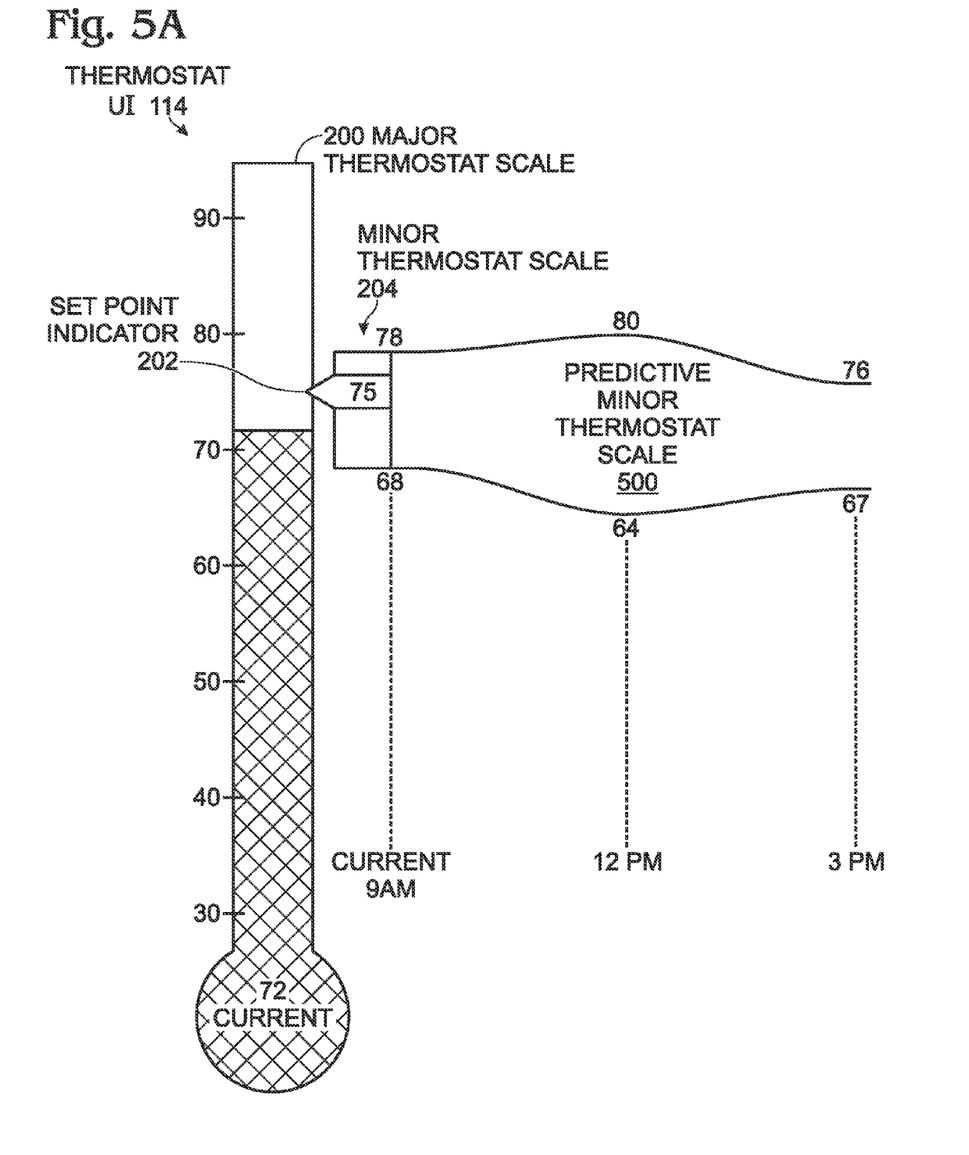
FIGS. 5A and 5B are diagrams depicting a thermostat UI with a predicted set point range.
Figure 5B:
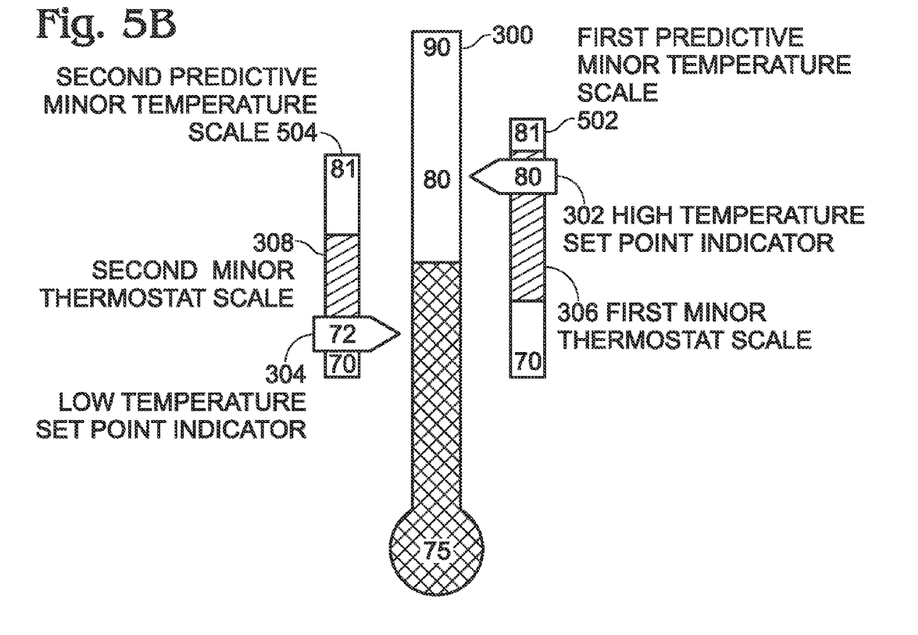

FIGS. 5A and 5B are diagrams depicting a thermostat UI with a predicted set point range. In addition to the set point range shown by the minor thermostat scale 202 (FIG. 5A), the thermostat UI 114 presents a predicted set point range using predictive minor thermostat scale 500. The predicted set point range, configured using predictive minor temperature scale 500, is a range of predicted sensor temperature measurement variations from the set point input, using a current set point range (i.e. the minor thermostat scale 204) as a baseline. Here, the predictive minor thermostat scale 500 shows a predicted set point range as a function of time. In one aspect, the thermostat UI may have a control that lets the user specify the time period of the prediction. However, in practice a fixed prediction period (e.g., 1 day) may be more practical.

FIG. 5B depicts a predictive first minor thermostat scale 502 for a high temperature set point input, and a second predictive minor thermostat scale 504 for a low temperature set point input. Here, the predictive minor scales just show maximum and minimum values. Again, the thermostat UI may have a control that lets the user specify the time period of the prediction.

While the thermostat UI is intended primarily a graphical presentation to the user, displayed numbers for parameters such as cool set point, cool range minimum, cool range maximum, heat set point, heat range minimum, heat range maximum, and present temperature may be positioned near the graphical object to supplement the graphical representation. Additionally, the present HVAC strategy being employed by the thermostat algorithms may also be displayed. For example, if the system is pre-cooling during a period of low energy cost and driving the temperature below the users selected optimum cooling set point, then the display could show the target temperature graphically (or numerically) with the displayed notation of "Pre-cooling". A similar scenario can be displayed when pre-heating.

The display may be presented as commonly used thermostat (bulb type or dial type) which is readily recognizable by users. The controls on either side of the linear (arc) range are also easily recognized as a control by the user. Some unique aspects of the thermostat UI over conventional thermostat status/control displays are as follow. The ranges of acceptable temperatures that the system allows are displayed to the user so that the user will understand, not only the optimum user set temperature, but also possible temperatures which the user may experience. These ranges are displayed as the set point range by the minor thermostat scales.

As the user changes other system constraints or goals (e.g. ecology, cost, and comfort factors), which are fed into the system algorithms, the display dynamically presents the effect of the changes on the allowable temperature ranges. This dynamic feedback gives the user information useful in adjusting these other system parameters.

If the user modifies the set point range settings on the thermostat, then the algorithms may recomputed (inverse operation) and modify the algorithm input parameters to match the desired result. For example, the position of the marker in the triangular temperature algorithm symbol of FIG. 2 may be moved by an inverse algorithm operation further away from the comfort setting, if the user modifies the set point range to have a larger range of values.

Returning the FIG. 3, the thermostat UI may be displayed digitally in the "bulb" of the thermometer and by the height of the coloration (indicator of the expansion fluid height on the temperature scale). The heat control object is on the left side of the display. It's "pointer" indicates the low temperature set point input. The set point range maximum and range minimum are displayed above and below the object. The cooling control object on the right side is similar to the heating control object. Not shown are the controls for other factors which affect the heating and cooling ranges. When these other controls are adjusted, the heating and cooling ranges are dynamically adjusted.

Figure 6:
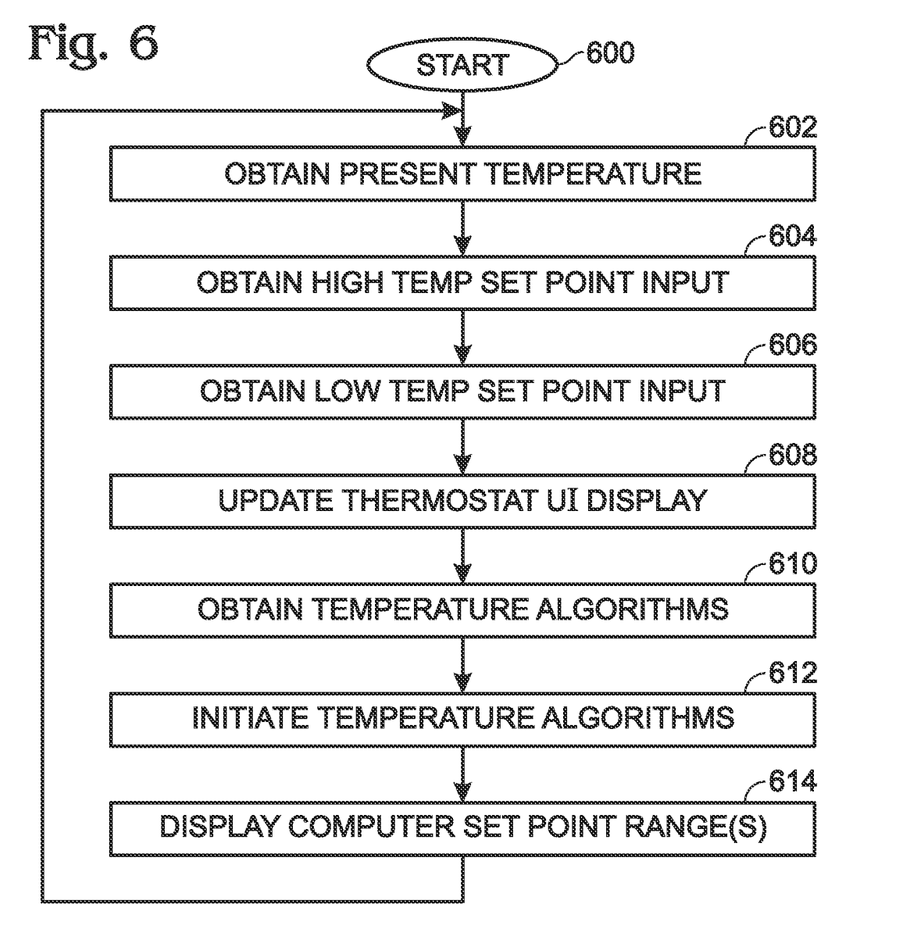
FIG. 6 is a flowchart illustrating an exemplary dynamic operation of the thermostat UI in collaboration with system algorithms and user inputs to these algorithms.

FIG. 6 is a flowchart illustrating an exemplary dynamic operation of the thermostat UI in collaboration with system algorithms and user inputs to these algorithms. The method begins at Step 600. Step 602 obtains the present room temperature from the thermostat (or sensor). Step 604 obtains the high temperature set point from the thermostat. Step 606 obtains the low temperature set point from the thermostat. Step 608 updates the thermostat object display with the present temperature and set points. Step 610 obtain all required HVAC control algorithm inputs from the user as previously stored values during setup configuration, or dynamically via UI controls. For example, environmental factors, cost factors, comfort factors, reliability factor, etc., may be considered. Step 612 initiate the HVAC algorithms to compute the HVAC strategy, such as OFF conditions, normal cooling, normal heating, pre-cooling, pre-heating, eco-cooling, eco-heating, urgent heating, urgent cooling, etc. The target temperature, heating acceptable range maximum and minimum values, and cooling acceptable range maximum and minimum values may be determined. Step 614 displays the computed ranges, target temperature, and strategy. Then, the method returns to Step 602 for the next iteration.

The system algorithms which configure the thermostat with set points and operational modes use a number of input parameters in its computations. These parameters may include the characteristics of the HVAC system as well as the controlled environment (room size, window count, thermal characteristics, etc.), the external environment (weather, shading, location, elevation, etc.), and the user configured operational parameters.

The algorithms compute new results frequently so that the user has relatively quick (e.g. sub-second) feedback on any parameter adjustments that they may make.

A system with set point range analysis has been provided with an associated thermostat UI. Examples of particular displays, icons, and hardware units have been presented to illustrate the invention. However, the invention is not limited to merely these examples. Other variations and embodiments of the invention will occur to those skilled in the art.

We claim:

1. A thermostat control system with set point ranging analysis, the system comprising:
   an energy consumption device having an input to accept an energy resource, an input to accept consumption commands, and an output to supply a controlled temperature medium;
   a sensor having an output to supply a temperature measurement responsive to the temperature medium;
   a thermostat user interface (UI) to accept a temperature set point input from a user, and to present a set point range, where the set point range is a range of permitted sensor temperature measurement variations from the set point input;
   a processor;
   a non-transitory memory;
   an energy management application stored as a sequence of software instructions in the memory and executed by the processor for managing the energy consumption device and the thermostat UI, the energy management application supplying the set point range to the thermostat UI in response to analyzing the set point input and the sensor temperature measurement;
   wherein the thermostat UI includes:
   a major thermostat scale for presenting a current temperature and an overall range of feasible temperatures;
   a high temperature set point input with respect to the major thermostat scale;
   a low temperature set point indictor indicating the low temperature set point input with respect to the major thermostat scale;
   a first minor thermostat scale for presenting the high temperature set point range, bracketing the high temperature set point indicator with a maximum temperature value representing a highest temperature in the high temperature set point range, and a minimum temperature value representing a lowest temperature in the high temperature set point range; and,
   a second minor thermostat scale for presenting the low temperature set point range, bracketing the low temperature set point indicator with a maximum temperature value representing a highest temperature in the low temperature set point range, and a minimum temperature value representing a lowest temperature in the low temperature set point range.

2. The system of claim 1 wherein the energy management application accepts information selected from a group consisting a temperature control algorithm, weather forecast, energy cost forecast, a history of energy costs, user ecology criteria, user comfort criteria, and combinations of the above-mentioned information, and supplies the set point range to the thermostat UI in response to analyzing the set point input and the sensor temperature measurement, as modified by the information.

3. The system of claim 2 wherein the thermostat UI accepts a temperature control algorithm selected from a group consisting of cost, ecology, comfort, and a combination of the above-mentioned algorithms.

4. The system of claim 2 wherein the thermostat UI accepts user inputs modifying the set point range; and,
wherein the energy management application modifies a temperature algorithm in response to the modified set point range.

5. The system of claim 1 wherein the thermostat UI is a graphical user interface (GUI) enabled as a sequence of software instructions stored in the memory and executed by the processor, for presentation on a display monitor.

6. The system of claim 5 wherein the thermostat GUI display monitor is a touchscreen to accept inputs from the user.

7. The system of claim 1 wherein the major thermostat scale has a shape selected from a group consisting of a mercury bulb and an arc shape.

8. The system of claim 1 wherein the thermostat UI presents first and second minor thermostat scales that are located on opposite sides of the major thermostat scale.

9. The system of claim 1 wherein the thermostat UI presents a high temperature set point range overlapping the low temperature set point range.

10. The system of claim 1 wherein the thermostat UI presents a high temperature set point range spread different from a low temperature set point range spread.

11. The system of claim 1 wherein the first and second minor thermostat scales present the maximum and minimum temperature values bracketing their respective set point inputs in a relationship selected from a group consisting of symmetrical and asymmetrical.

12. The system of claim 1 wherein the first and second minor thermostat scales respectively present a predicted set point range, where the predicted set point range is a range of predicted sensor temperature measurement variations from the set point input, using a current set point range as a baseline.

13. A thermostat user interface (UI) for presenting calculated set point ranges, the thermostat UI comprising:
a major thermostat scale for presenting a current temperature and an overall range of feasible temperatures;
a set point indictor indicating a set point input with respect to the major thermostat scale, the set point indicator comprising:
a high temperature set point indictor indicating the high temperature set point input with respect to the major thermostat scale;
a low temperature set point indictor indicating the low temperature set point input with respect to the major thermostat scale;
a minor thermostat scale for presenting a set point range, where the set point range is a range of permitted temperature measurement variations from the set point input, the set point range bracketing the set point indicator with a maximum temperature value representing a highest temperature in the set point range, and a minimum temperature value representing a lowest temperature in the set point range, the minor thermostat scale comprising:
a first minor thermostat scale bracketing the high temperature set point indicator, with a maximum temperature value representing to highest temperature in the high temperature set point range, and a minimum temperature value representing a lowest temperature in the high temperature set point range; and,
a second minor thermostat scale bracketing the low temperature set point indicator, with a maximum temperature value representing a highest temperature in the low temperature set point range, and a minimum temperature value representing a lowest temperature in the low temperature set point range.

14. The thermostat UI of claim 13 wherein the first and second minor thermostat scales are located on opposite sides of the major thermostat scale.

15. The thermostat UI of claim 13 wherein the thermostat UI presents a high temperature set point range overlapping the low temperature set point range.

16. The thermostat UI of claim 13 wherein a high temperature set point range spread is different from a low temperature set point range spread.

17. The thermostat UI of claim 13 wherein the thermostat UI is a graphical user interface (GUI) enabled as a sequence of software instructions stored in a non-transitory memory and executed by a processor, for presentation on a display monitor.

18. The thermostat UI of claim 17 wherein the thermostat GUI display monitor is a touchscreen to accept inputs from the user.

19. The thermostat UI of claim 13 wherein the major thermostat scale has a shape selected from a group consisting of a mercury bulb and an arc shape.

20. The thermostat UI of claim 13 wherein the first and second minor thermostat scales include the maximum and minimum temperature values respectively bracketing the set point input in a relationship selected from a group consisting of symmetrical and asymmetrical.

21. The thermostat UI of claim 13 wherein the first and second minor thermostat scales respectively present a predicted set point range, where the predicted set point range is a range of predicted sensor temperature measurement variations from the set point input, using a current set point range as a baseline.

22. The thermostat UI of claim 13 wherein minor thermostat scale accepts user inputs for modifying the presented set point range.

* * * * *